United States Patent [19]

Brown

[11] 3,871,536

[45] Mar. 18, 1975

[54] UNDERGROUND PIPE WARNING AND IDENTIFICATION SYSTEM

[76] Inventor: James R. Brown, 875 Richey Rd., Zanesville, Ohio 43701

[22] Filed: Dec. 19, 1973

[21] Appl. No.: 425,971

Related U.S. Application Data

[63] Continuation-in-part of Ser. No. 298,583, Oct. 18, 1972, Pat. No. 3,817,411.

[52] U.S. Cl....... 214/138 R, 37/DIG. 1, 37/DIG. 19, 172/6, 214/761, 214/762
[51] Int. Cl............................................. E02f 9/24
[58] Field of Search................. 214/138 R, 761, 762

[56] References Cited
UNITED STATES PATENTS

| 1,537,069 | 5/1925 | Davis | 340/419 |
|---|---|---|---|
| 2,534,107 | 12/1950 | Curzon | 340/419 |
| 3,817,411 | 6/1974 | Brown | 214/138 R |

Primary Examiner—Robert J. Spar
Assistant Examiner—Ross Weaver

[57] ABSTRACT

Apparatus for use in conjunction with excavating machinery includes a warning and identification circuit for locating underground pipes and having a first indicator signalling the in-use status of the circuit, a warning lamp and a warning horn selectively actuated in response to the physical contacting of the tool portion of the excavating machine with an underground pipe, a selector switch operable to classify the type of pipe which has been contacted, a disabling circuit for automatically interrupting operation of the excavating machine upon contact with the pipe, a by-pass switch for deactivating the disabling circuit but not the audible and visual warning features of the system, a sensory line for connection to an electrical grounding system for use when excavating in an area having active underground conduits, which are themselves connected to an electrical grounding system, to enable machine shut down or the generation of a warning signal upon contact between the tool and one of the active conduits regardless of the distance between the electrical grounding systems, and a circuit protection element for disconnecting the warning and identification circuits in the event the tool contacts an underground high voltage line.

3 Claims, 4 Drawing Figures

PATENTED MAR 18 1975  3,871,536

UNDERGROUND PIPE WARNING AND IDENTIFICATION SYSTEM

RELATED APPLICATIONS

This application is a continuation-in-part of my copending application Ser. No. 298,583, now, U.S. Pat. No. 3,817,411, entitled Underground Pipe Warning and Identification Apparatus, filed Oct. 18, 1972.

BACKGROUND OF THE INVENTION

1. Field of the Invention

The present invention relates generally to warning systems and, more particularly, to a warning and identification system for enabling excavating machines to avoid damaging underground pipes while at the same time identifying the same.

2. Description of the Prior Art

In numerous instances, it is necessary to excavate or dig ditches or channels in areas containing many metallic, underground pipes such as those carrying natural gas, water, electrical wires, telephone cables, sewerage and the like. Often such excavation is needed to install additional conduits or for diverse construction projects where it is desirable that existing pipelines be left undamaged. In other cases, particular damaged or deteriorated pipes must be replaced and, thus, must be properly identified during excavation. This is extremely difficult where the location and identification of various pipes is not accurately recorded or otherwise available before the digging operation starts.

In the past, it has been the general practice to excavate with heavy machines having no safety or warning apparatus whatsoever. However, the frequency of underground pipe damage and the great danger consequent to the unintentional rupture of gas lines, for example, has made in increasingly important to equip such machines with warning and safety systems which register any contact made by the machinery with an underground pipe.

Prior art systems of this general type have attempted to solve the problems noted above, but have not proven entirely satisfactory in operation. Generally, systems heretofore available have been complex, costly, incapable of providing any warning other than that incident to contact with a pipe, unable to provide a signal identifying the type of pipe which has been found, and unsafe in the failure to provide safety cut-off of the machine so as to prevent damage to the pipes after they have been located. The above deficiences have proven to be material disadvantages, with the result that systems heretofore available typically have found only limited acceptance in the marketplace and are generally considered to be somewhat impractical.

SUMMARY OF THE INVENTION

Accordingly, it is an object of the present invention to warn the operator of excavating, tunneling, digging, drilling or the like machinery of the contact of the machine tool with a buried metallic pipe.

It is a further object of this invention to enable a machine operator to identify particular ones of a plurality of buried pipes.

This invention has another object in the construction of safety apparatus responsive to the contact of a machine tool with a buried pipe for disabling such machine prior to damaging the pipe.

A further object of the invention is the provision of by-pass apparatus for deactivating the disabling circuit but not the in-use and warning signals so that the machinery will continue to operate while the warning system continues to provide a warning signal whenever an underground pipe is contacted.

A further object of the invention is the provision of a sensory line for connection to an electrical grounding system, for detecting contact between the tool and any active conduit that is also connected to an electrical grounding system, regardless of the distance between the two electrical grounding systems.

A further object of the invention is the provision of a circuit protection element in the warning system circuit for disconnecting the warning and identification circuits in the event the tool contacts an underground high voltage line.

The present invention is summarized in that a warning system for use with excavating apparatus includes a register network connected with a tool of the excavating apparatus and having an input terminal, the register being responsive to the receipt of an alarm signal applied to the input terminal to generate a perceptible warning signal; a plurality of sensor cables, each adapted to be connected to a respective one of a plurality of underground pipes and producing an alarm signal whenever the pipe associated therewith is contacted by the tool and a switching circuit selectively interconnecting individual ones of the sensor cables to the input terminal of the register such that the particular underground pipe contacted by the tool may be readily identified. Additionally, the invention includes disabling means for automatically interrupting operation of the excavating machine upon contact with the pipe; by-pass means for deactivating the disabling means without interferring with the operation of the warning system; a sensory line connected to an electrical grounding system for enabling the warning system to operate whenever the tool contacts an active underground circuit which is also connected to an electrical grounding system, regardless of the distance between the grounding systems; and a circuit protection element included in the warning system to protect against damage caused by contact of the tool with a high voltage line.

Other objects and advantages of the present invention will become apparent from the following description of the preferred embodiment when taken in conjunction with the accompanying drawing.

DESCRIPTION OF THE PREFERRED EMBODIMENT

Figure 1:
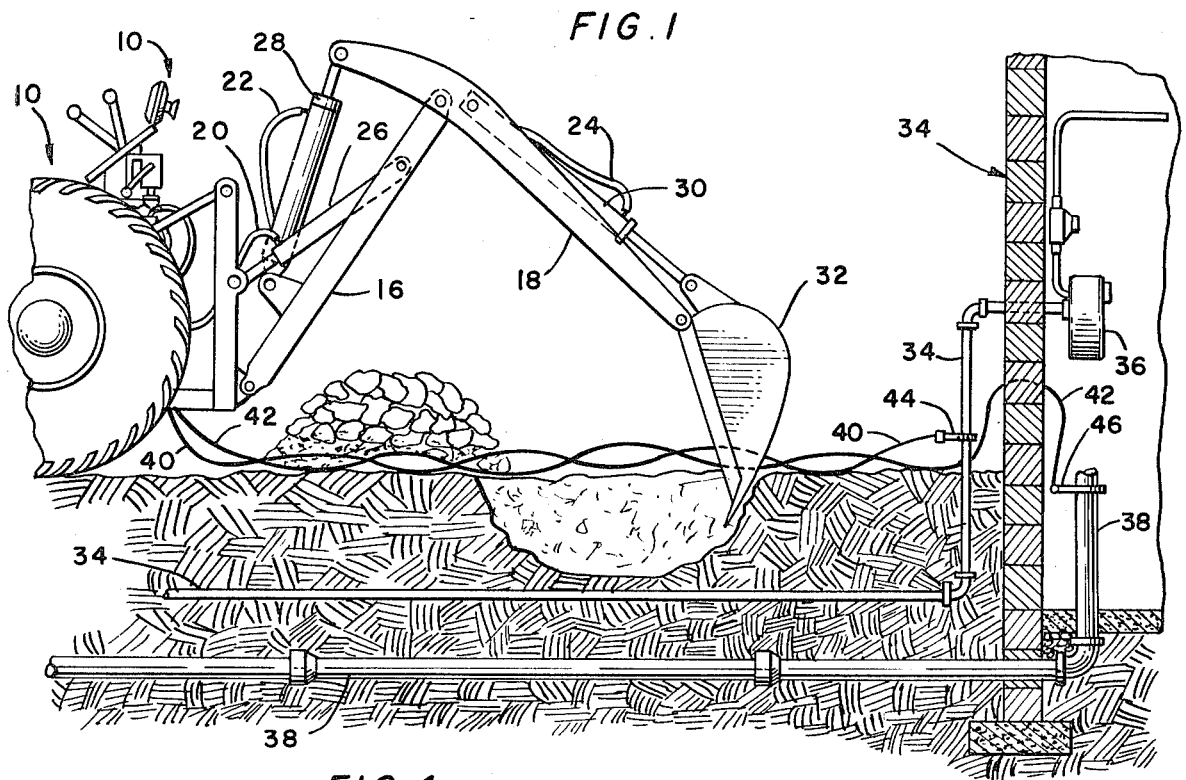
FIG. 1 is a diagrammatic elevational view, partially in section, of an excavating machine equipped with a preferred embodiment of an underground pipe warning and identification system according to the present invention.

The present invention is embodied in a warning assembly, indicated generally at 10 in FIG. 1, which is mounted on an excavating, drilling, digging, trenching or the like machine, such as a backhoe 12. The backhoe 12, of course, is merely illustrative of the general class of machines for which the present invention may be used, and the invention has general utility for excavating operations wherever buried or hidden metallic conduits may be encountered.

Backhoe 12 has a source of pressurized hydraulic fluid (not shown) which communicates via a main hydraulic line 14 (FIG. 2) with control valves (not shown) for the tool linkage members 16 and 18 and thence through lines 20, 22 and 24 to hydraulic cylinders 26, 28 and 30, respectively. Cylinders 26, 28 and 30 are mounted in a conventional manner and control the position of the bucket or tool 32 which is pivotally disposed on the distal end of linkage assembly 16 and 18.

A building structure 34 adjacent the excavation site is supplied with gas, water, electricity, etc., via metallic conduits, such as a gas line 34 leading to a conventional gas meter 36, and a sewer line 38. Pipes 34 and 38 typically run underground and, as illustrated, may traverse the excavation area under the tool 32. A pair of sensor cables 40 and 42 run from the warning assembly 10 to pipes 34 and 38, respectively, where they are attached to any suitable connector such as clamps 44 and 46. It should be understood, of course, that any number of sensing cables may be provided to accommodate any number of pipes or conduits, with only two such cables shown in the drawing for the sake of brevity.

Figure 2:
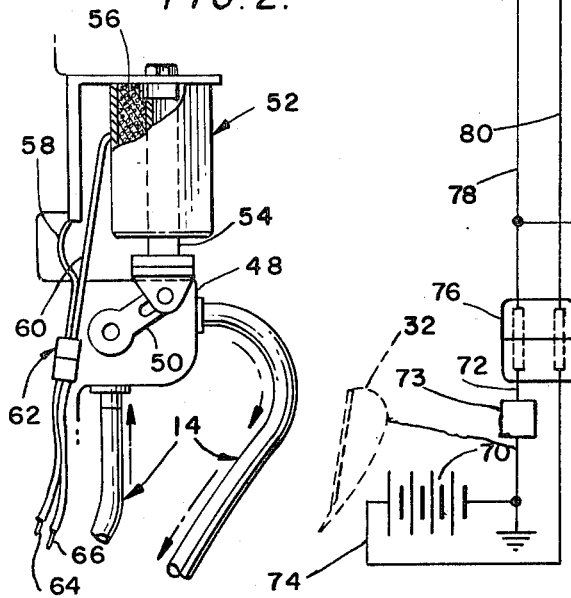
FIG. 2 is an elevational view in detail of the cut-off solenoid of the system of FIG. 1.

Referring now to FIG. 2, interposed in the main fluid supply line 14 is a cut-off assembly having a two-way hydraulic valve 48 which is operated through a journalled lever arm 50 by a solenoid actuator 52. Actuator 52 includes a solenoid plunger or operator member 54 connected to the end of arm 50 and adapted to move reciprocally or linearly in response to the energized condition of an electromagnetic coil 56. Solenoid 52 is suitably mounted to the frame of the backhoe 12 as shown, and plunger 54 is preferably biased upwardly so as to open valve 48 when coil 56 is released and moves down to close the valve when operating potential is applied across the winding 56. The two ends 58 and 60 of winding 56 are fed to a plug assembly 62 for establishing electrical communication with lines 64 and 66, respectively, of the warning circuit 10 such that appropriate alarm signals will actuate the cut-off solenoid to preclude continued operation of the backhoe and possible pipe damage.

Figure 3:
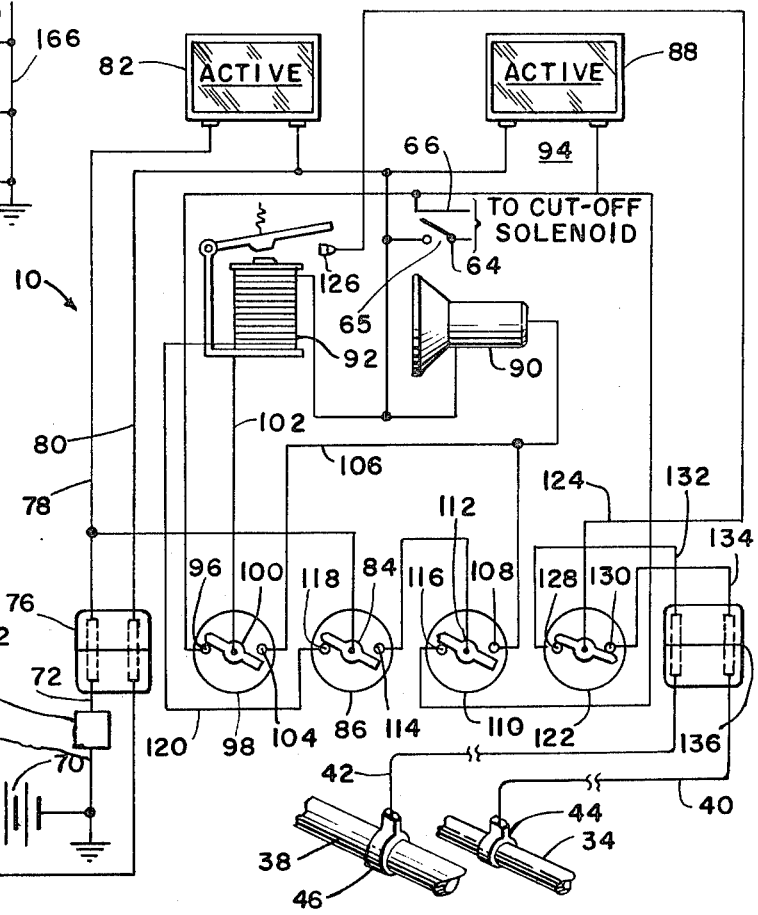
FIG. 3 is a schematic diagram of the register and associated circuitry of the system of FIG. 1.

The warning assembly 10 of the present invention is illustrated in schematic form in FIG. 3. A suitable source of operating potential which may be a 6, 12 or 24 volt DC battery 70, has its negative pole connected to ground lead 72 and its positive terminal fee via line 74 to one section of a two conductor plug assembly 76. A circuit protective element such as a fuse or circuit breaker 73 is connected in the ground lead 72, directly to the tool 32. Plug 76 connects line 72 and 74 to a main ground bus 78 and a main power supply bus 80, respectively. Ground bus 78 is connected to one terminal of an active or in-status warning lamp 82, which preferably provides an amber indication when lit, and to the movable contact 84 of an on-off-test switch 86. The main power supply bus 80 is fed to the other terminal of active lamp 82 as well as to one terminal of a preferably red alarm or warning lamp 88, one terminal of an alarm horn 90, line 64 of cut-off solenoid 52, and a first terminal of a relay winding coil 92. The second terminal of alarm lamp 88 is fed via line 94 to lead 66 of cut-off solenoid 52 as well as to a first fixed contact 96 of a lamp-horn selector switch 98. A normally closed by-pass switch 65 is connected in line 64 in series with the cut-off solenoid 52.

The movable contact 100 of switch 98 is connected via line 102 to one side of the normally open contacts of relay 92, and the second fixed contact 104 of switch 98 is fed via line 106 to the second terminal of horn 90 as well as to a fixed contact 108 of a test selector switch 110. The movable contact 112 of switch 110 is connected to a fixed contact 114 of switch 86, with line 94 of alarm lamp 88 fed to a second fixed contact 116 of switch 110. Similarly, a second fixed contact 118 of switch 86 is coupled via line 120 to the second terminal of the relay coil winding 92.

A pipe selector and identification switch 122 has a movable contact connected via line 124 to a fixed contact 126 of the normally open relay contacts, and has a pair of fixed contacts 128 and 130 which are connected to the two conductors 132 and 134 of a second plug assembly 136. The other side of plug assembly 136 is connected with sensor cables 40 and 42 so as to tie the warning system 10 with the various underground pipes. As noted above, only two sensor cables 40 and 42 are illustrated herein, however, it is noted that any number of sensor cables may be utilized in conjunction with the present invention whereupon the number of fixed contacts and positions of pipe selector switch 122 would be increased accordingly.

In operation, it is first noted that the tool or bucket 32 of backhoe 12 is electrically conductive and is thus connected to the ground lead 72 of the warning assembly 10. Therefore, the backhoe tool 32 in a sense becomes an electrical probe for the warning and indication apparatus during the excavation operation. Initially, operating potential from battery 70 will be supplied via lines 72 and 74, plug assembly 76, and lines 78 and 80 to the active or in use indicator lamp 82. If the battery 70 is performing satisfactorily, the active lamp 82 will become energized so as to provide an amber indication that the warning assembly is ready for operation. Thereafter, switch 86 is actuated by moving the movable contact 84 into engagement with fixed contact 118. In this position, line 120 is tied to ground bus 78 through switch 86 whereupon the relay coil 92 becomes energized.

The energization of relay coil 92 closes the normally open contacts thereof such that fixed contact 126 is connected with the movable contact 100 of switch 98 via line 102. Switch 98 may be set to a first position in engagement with fixed contact 96 for the actuation of alarm lamp 88 or a second position in engagement with fixed contact 104 for the operation of horn 90, as desired. Thereafter, if the bucket or tool portion 32 of the backhoe 12 should come into physical contact with either pipe 34 or pipe 38, the sensor cable associated therewith will be tied to ground. Accordingly, the grounding of pipe 34 or pipe 38 will cause conductor 124 to sense the ground signal such that the movable contact 100 of switch 98 is held at ground potential. Since the other sides of both the alarm lamp 88 and the horn 90 are tied to the main power bus 80, the grounding of the movable contact 100 of switch 98 will produce the energization of either of the alarm and horn devices depending upon which device is selected by switch 98.

Since the cut-off solenoid relay coil 56 is connected in parallel with alarm lamp 88 via lines 64 and 66, the receipt of an alarm indication causes the actuation of the solenoid 52 and the simultaneous cut-off of hydraulic fluid by valve 48. Thus, as soon as a pipe has been contacted by the bucket or tool 32 of the backhoe 12, a suitable warning is provided by lamp 88 and the excavating machine is thereafter disabled to preclude damage to the contacted pipe.

It may be that in some situations the operator of the backhoe 12 will wish to continue to excavate after making contact with an underground metal conduit, even while the tool continues to contact other underground conduits. To this end the by-pass switch 65 is provided in the line 64 in series with the cut-off solenoid 52. If the operator wishes to continue operating the machine after making contact with an underground conduit, the normally closed switch 65 is opened, thereby removing the cut-out solenoid 52 from the warning circuit. Thereafter the visual or audible warning portion of the warning system continues to function whenever the tool contacts an underground conduit, but the machine will not be completely shut down by such contact because the cut-out solenoid 52 no longer functions to interrupt the flow of hydraulic fluid through the valve 48.

In normal operation of the warning system whenever the tool 32 contacts an underground conduit, the backhoe 12 is disabled or shut down and the visual or audible alarm is activated to inform the operator of the contact. The shut down of the machine and the sounding or viewing of an alarm signal does not alert the operator to any potential hazard associated with that conduit such as, for example, the fact that the conduit is an underground high voltage line. The fuse or circuit breaker 73 adds a safety feature to the warning system to alert the operator of such a hazard. Whenever the tool 32 contacts an underground high voltage line, the fuse or circuit breaker 73 is activated and functions to interrupt any high current surge from that high voltage conduit to the warning circuit and the power supplied by the battery 70 to the in-use status light 82. Thus the warning circuit is protected from any surge in current and the backhoe operator, because the light 82 is extinguished, is alerted that the conduit is actually a high voltage line, and that extreme caution should be exercised during further excavating in that area.

Figure 4:
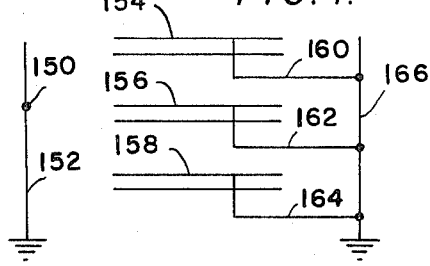
FIG. 4 is a schematic diagram illustrating an alternative mode of operation for the invention.

An alternative embodiment of the invention is useful when excavating in areas where electrical grounding systems are prevalent. Referring now to FIG. 4, a single sensor line 150, which may, for example, connect at one end to lines 132 or 134 of the warning system, is shown connected at its other end to an electrical grounding system 152. Also illustrated are three active underground conduits 154, 156 and 158, which are themselves connected via lines 160, 162 and 164, respectively, to another electrical grounding system 166. When these connections exist, and when the tool 32 contacts any active, grounded conduit such as 154, 156 or 158, either the audible alarm or the warning lamp or the solenoid 52 will be activated depending upon the particular connection of the sensory line. While this mode of operation does not permit the identification of a particular conduit, it does provide a common source for detecting any active underground conduit that is connected to a grounding system.

Pipe selector switch 122, which is a conventional three position switch, has, in the diagrammatic exemplary showing in FIG. 3, three positions. In the first position conductor 124 is adapted to be connected with both fixed contacts 128 and 130, while the second and third adaptable positions (not shown) of switch 122 provide separate interconnections of lead 124 with either of the two fixed contacts 128 and 130. Thus, with the switch in the first position, a warning signal will be provided by the contact of bucket 32 with any of the underground pipes provided with a particular sensor cable. As noted above, a warning either in the firm of an audible alarm via horn 90 or a visible signal via lamp 88 will be provided as soon as an underground pipe has been touched by the tool 32. Thereafter, the present invention enables the backhoe operator to readily identify the contacted pipe by merely moving switch 122 to its second and third positions. Since only that circuit associated with the particular pipe which has been contacted by the tool 32 will be grounded, the initially registered alarm will persist only when switch 122 is moved to the position associated with the contacted pipe. By utilizing color coded or otherwise marked sensor cables for attachment with gas, water, sewer pipes etc. in a particular predetermined sequence, and by correlating the sequence with the switch positions of selector switch 122, the backhoe operator may readily identify the type of pipe which has been contacted without having to leave the controls of the backhoe.

Thus, the present invention has numerous advantages over prior art systems especially in the rapid identification and warning of the contact of an excavating tool with an underground pipe, the automatic disabling of the excavating apparatus upon such contact, and the immediate identification of the nature of the conduit which has been contacted. The latter feature is particularly advantageous when a particular pipe is being replace and thus must be located by the operator of the excavating machine during the excavation process. Thus, while the present invention is simple and for that reason quite inexpensive, it provides numerous advantageous functions both rapidly and precisely and without the need for operator training.

The present invention also provides a test mode wherein the operative status of the alarm lamp 88, the horn 90 and the cut-off solenoid 52 may be easily tested at any time during the course of the excavation process. Referring to FIG. 3, by placing the movable contact 84 of switch 86 in engagement with fixed contact 114 thereof, the movable contact 112 of switch 110 is tied to ground. Thus, if movable contact 112 is placed in engagement with fixed contact 116, line 94 feeding alarm lamp 88 is returned to ground such that the alarm lamp will become illuminated if it is operative. Likewise for the solenoid coil 52 which, as noted above, is preferably wired in parallel with the alarm lamp 88. In its second position, switch 110 ties fixed contact 108 thereof to ground such that the return lead of horn 90 is tied to reference potential for producing energization thereof, again, only if it is operative. Thus, switches 86 and 110 cooperate to enable the application of operating potential from battery 70 directly across either the alarm lamp 88 (as well as solenoid coil 52) or horn 90 for facilitating the test of these elements during operation.

Inasmuch as the present invention is subject to many variations, modifications and changes in detail, it is in-

What is claimed is:

1. A warning system for an excavating apparatus having an electrically conductive tool, comprising:

means connecting said conductive tool to a point of reference potential and to one side of a source of operating potential;

input means adapted to be connected with the other side of said source of operating potential;

an alarm circuit connected with said input means and having an input terminal and comprising alarm means, said alarm means being responsive to the receipt of a generating signal on said input terminal to establish a perceptible warning signal;

a plurality of sensor means in said alarm circuit, each adapted to be connected to a respective one of a plurality of underground pipes at points above ground level and to said alarm means;

switch means initially in a position for completing the alarm circuit whenever a particular one of said pipes is contacted by said tool whereby said alarm means is actuated and then being selectively operable to connect only the contacted one of said pipes with its respective sensor means with said alarm means so that the particular underground pipe contacted by said tool may be readily identified;

solenoid means being provided in said alarm circuit and being responsive to the contact of said tool with an underground pipe for automatically disabling the excavating apparatus; and, by-pass switch means in said alarm circuit with the solenoid means for selectively deactivating said solenoid means while maintaining active the alarm means.

2. A warning system for an excavating apparatus having an electrically conductive tool, comprising:

means connecting said conductive tool to a point of reference potential and to one side of a source of operating potential;

input means adapted to be connected with the other side of said source of operating potential;

an alarm circuit connected with said input means and having an input terminal and comprising alarm means, said alarm means being responsive to the receipt of a generating signal on said input terminal to establish a perceptible warning signal;

a plurality of sensor means in said alarm circuit, each adapted to be connected to a respective one of a plurality of underground pipes at points above ground level and to said alarm means;

switch means initially in a position for completing the alarm circuit whenever a particular one of said pipes is contacted by said tool whereby said alarm means is actuated and then being selectively operable to connect only the contacted one of said pipes with its respective sensor means with said alarm means so that the particular underground pipe contacted by said tool may be readily identified; and, protective means for said alarm circuit to indicate contact between said tool and an underground high voltage source and to interrupt any high current surge from such source to the alarm circuit.

3. A warning system for an excavating apparatus having an electrically conductive tool, comprising:

means connecting said conductive tool to a point of reference potential and to one side of a source of operating potential;

input means adapted to be connected with the other side of said source of operating potential;

an alarm circuit connected with said input means and having an input terminal and comprising alarm means, said alarm means being responsive to the receipt of a generating signal on said input terminal to establish a perceptible warning signal;

a plurality of sensor means in said alarm circuit, each adapted to be connected to a respective one of a plurality of underground pipes at points above ground level and to said alarm means;

switch means initially in a position for completing the alarm circuit whenever a particular one of said pipes is contacted by said tool whereby said alarm means is actuated and then being selectively operable to connect only the contacted one of said pipes with its respective sensor means with said alarm means so that the particular underground pipe contacted by said tool may be readily identified; and, said plurality of sensor means including a single sensory line connecting said alarm circuit to an electrical grounding system whereby contact between said tool and any active underground pipe which is also connected to an electrical grounding system will activate the alarm means.

* * * * *